United States Patent [19]

Okada

[11] Patent Number: 5,191,654

[45] Date of Patent: Mar. 2, 1993

[54] MICROPROCESSOR FOR HIGH SPEED DATA PROCESSING

[75] Inventor: Mitsuji Okada, Tokyo, Japan

[73] Assignee: NEC Corporation, Tokyo, Japan

[21] Appl. No.: 822,049

[22] Filed: Jan. 16, 1992

[30] Foreign Application Priority Data

Jan. 16, 1991 [JP] Japan ................................. 3-3014

[51] Int. Cl.[5] ............................................ G06F 13/00
[52] U.S. Cl. ................................................... 395/275
[58] Field of Search ...................... 395/275, 325, 800; 364/DIG. 1, DIG. 2

[56] References Cited

U.S. PATENT DOCUMENTS 4,471,426 9/1984 McDonough ........................ 395/800

Primary Examiner—Robert L. Richardson

Attorney, Agent, or Firm—Whitman & Marhoefer

[57] ABSTRACT

A microprocessor is provided with one input/output port per bit including a decoder 6 for determining whether or not a bit assigned to the input/output port is selected for a procesing operation in an output mode, and a processing circuit 12 for processing an operation that has been designated. The processing circuit 12 comprises at least one processing element for processing supplied 1-bit data for the processing and/or output latch data held inside the processing circuit itself. The processing element is selected by separately inputted processing information for outputting processed data. A masking circuit outputs the processed data from an output terminal only when an output signal from the decoder 6 indicates that the bit assigned to the input-/output port is selected.

10 Claims, 3 Drawing Sheets

MICROPROCESSOR FOR HIGH SPEED DATA PROCESSING

BACKGROUND OF THE INVENTION

1. Field of the Invention

The present invention relates to a microprocessor, and more particularly to an input/output port for bit processing operation.

2. Description of the Related Art

As shown in FIG. 1 of the accompanying drawings, the conventional 8-bit microprocessor has, for each bit, an input/output port which comprises an input/output port terminal 24, an internal bus 25 for inputting data into the microprocessor and outputting data from the microprocessor, a mode register 26 for selecting an input mode or an output mode according to data set by a write signal 27 from the internal bus 25, an output latch 28 for holding output data set by a write signal 29, a NAND gate 36 inputting a read signal 31 and a signal from the input/output port terminal 24 in an input mode, inverters 32, 34, and buffers 33, 35. The 8-bit microprocessor has a total of eight such input/output ports for inputting data from and outputting data to an input/output device (not shown).

Operation of the input/output port for processing one-bit data in an output mode will be described below with reference to FIGS. 1 and 2 of the accompanying drawings.

It is assumed that two clock pulses are required to read data held by the output latch 28 into a CPU (not shown) through the internal bus 25 in response to the read signal 30 two clock pulses to write data from the CPU through the internal bus 25 into the output latch 28 in response to the write signal 29, and one clock pulse for the CPU to process the data.

When the read signal 30 is applied, the data held by the output latch 28 is read into an ALU of the CPU during the period of clock pulses A, B. The ALU processes the data during the period of a clock pulse C, and then the processed data is written into the output latch 28 during the period of clock pulses D, E when the write signal 29 is applied.

Since the data latched by the output latch 28 is first read and then processed by the ALU of the CPU, as described above, the conventional microprocessor requires a relatively long time, i.e., a relatively large number of clock pulses, for inputting and outputting desired data.

SUMMARY OF THE INVENTION

In view of the aforesaid problems of the conventional microprocessor, it is an object of the present invention to provide a microprocessor which requires a reduced period of time for inputting and outputting desired data, thereby allowing high-speed data processing operation.

According to the present invention, there is provided a microprocessor having as many input/output ports as the number of bits of data to be processed, for processing output latch data of bits in an output mode, each of the input/output ports including a decoder for determining whether a bit assigned to the input/output port is selected or not based on bit information which is supplied from a CPU for designating a bit to be processed, and a processing circuit comprising at least one processing element for processing 1-bit data for the processing which is supplied from the CPU and/or output latch data held inside the processing circuit itself, selecting means for transferring processed data from the processing element which is designated by processing information which is supplied from the CPU for designating a processing operation to be effected, and masking means for allowing the processed data transferred from the selecting means to be outputted only when the bit assigned to the input/output port is selected as determined by the decoder.

When it is necessary to process one desired bit of output data, the corresponding bit of the various processed data that have been held is selected in accordance with the processing information and outputted. The cycle necessary for carrying out a bit-processing operation is composed of only a cycle for applying the write signal into the port. Therefore, the processing time required by the microprocessor is shorter than the processing time required by conventional microprocessors.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 3:
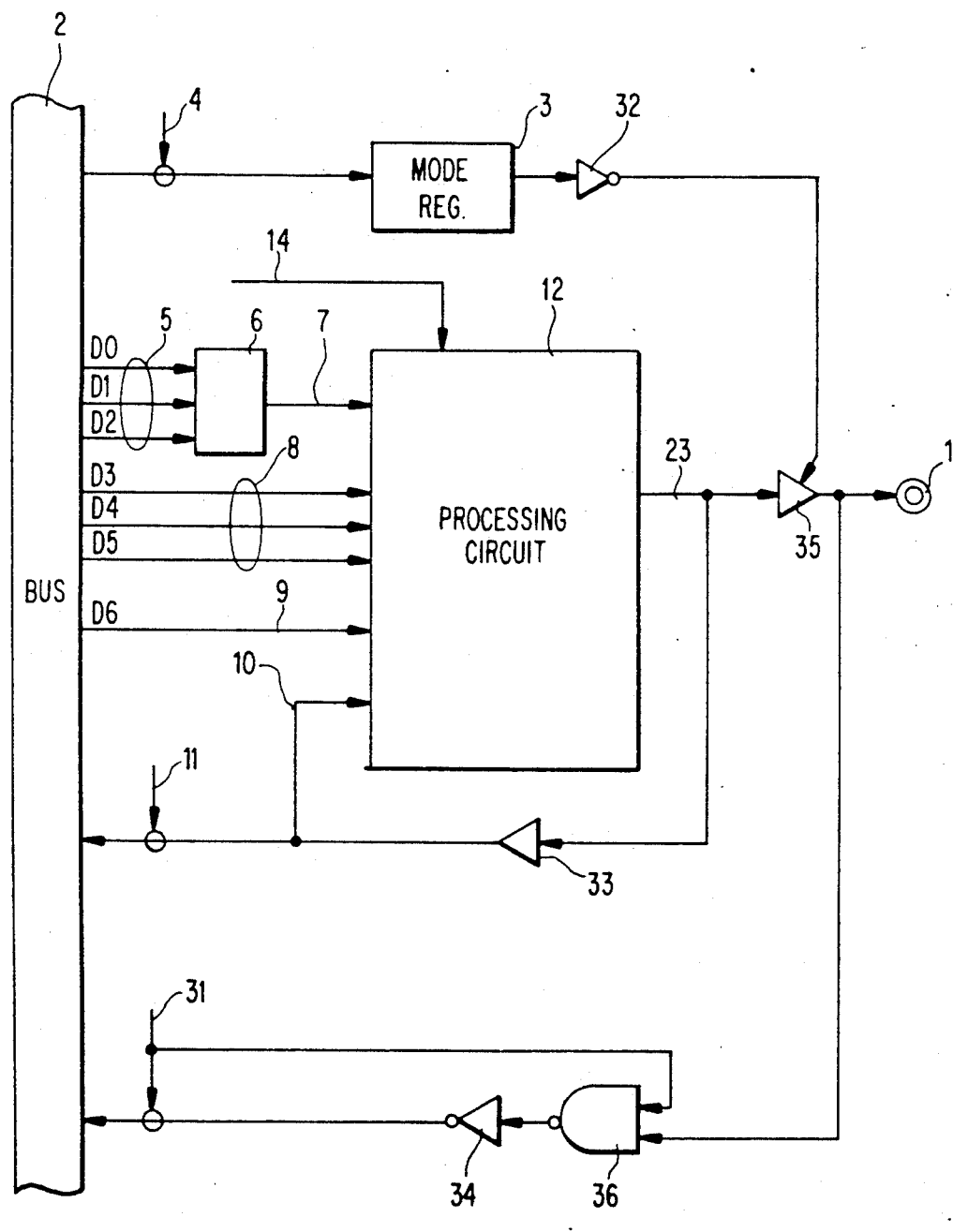
FIG. 3 is a block diagram of one bit of the input/output port of a microprocessor according to the present invention.
Figure 4:
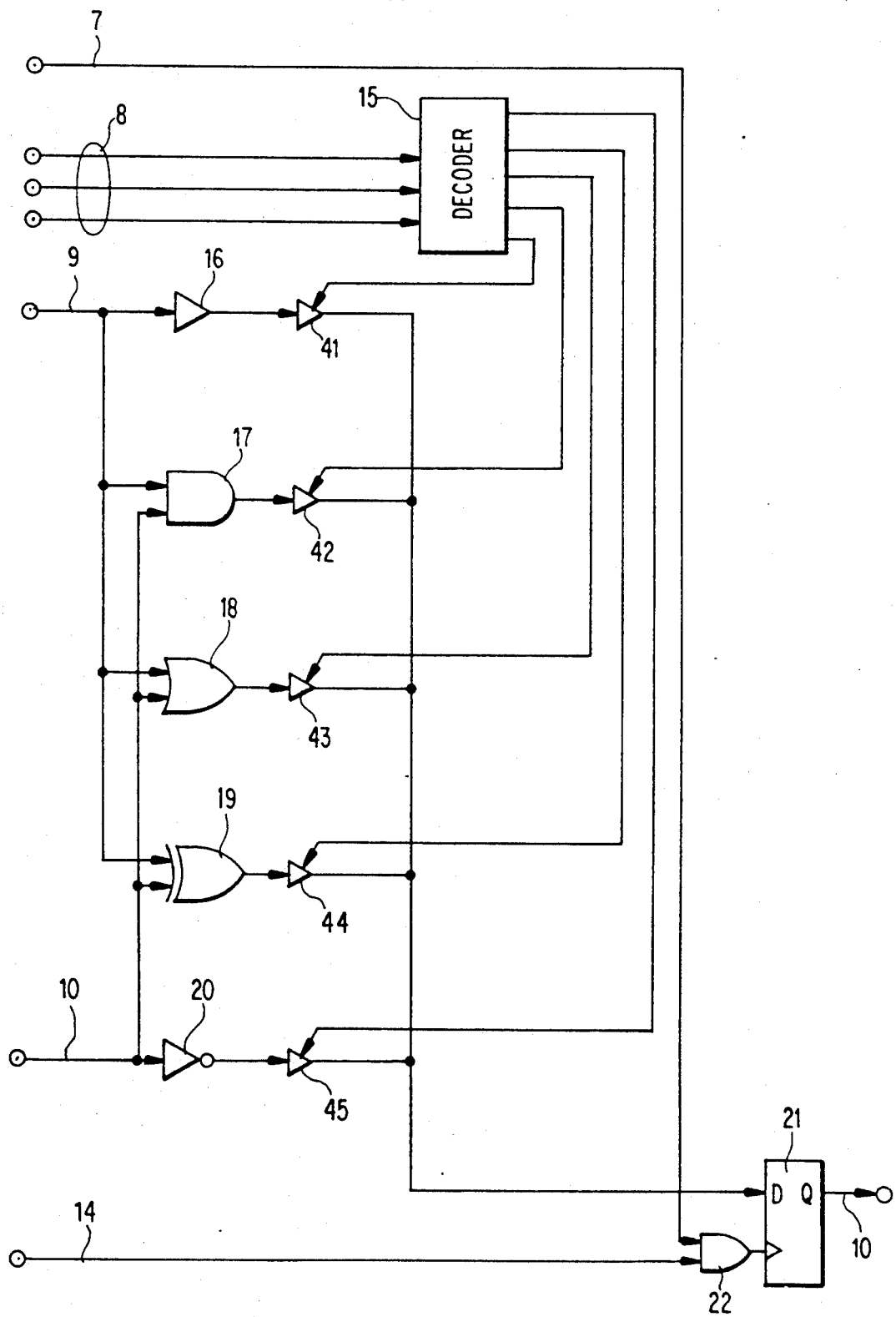
FIG. 4 is a block diagram showing a detailed arrangement of a processing circuit of the input/output port shown in FIG. 3.

FIGS. 3 and 4 show in block form one bit of the input/output port of an 8-bit microprocessor according to the present invention. The 8-bit microprocessor includes a total of eight input/output ports, each of the same arrangement as that shown in FIGS. 3 and 4.

As shown in FIG. 3, in response to a write signal 4, data from an internal bus 2, which is indicative of an input mode or an output mode, is stored in a mode register 3. Based on the stored data, the mode register 3 turns on or off a switching buffer 35 through an inverter 32. A decoder 6 receives, from the internal bus 2, bit information 5 that designates a bit to be processed, and outputs an output signal 7 indicative of whether the bit has been designated, to a processing circuit 12. The bit information 5 is composed of three bits $D_0$, $D_1$, $D_2$.

The processing circuit 12 will be described below with reference to FIG. 4. The processing circuit includes an output latch 21 having a data input terminal D to which processed output data is inputted. The output latch 21 outputs output latch data 10 when it is turned on by an AND gate 22 that inputs the output signal 7, which designates the bit assigned to the input/output port, from the decoder 6 and a write signal 14. The processing circuit also includes a bit transfer buffer 16 that is supplied with 1-bit data 9 for the processing from the internal bus 2, a NOT gate 20 that is supplied with the output latch data 10 from the output latch 21, an AND gate 17, an OR gate 18, and an exclusive-OR gate 19, the gates 17, 18, 19 being supplied with the 1-bit data 9 and the output latch data 10. The bit transfer buffer 16, the AND gate 17, the OR gate 18, the exclusive-OR gate 19, and the NOT gate 20 each have output terminals connected respectively to output buffer gates 41, 42, 43, 44 and 45. When the output buffer gates 41, 42, 43, 44, 45 are turned on, the bit transfer buffer 16, the AND gate 17, the OR gate 18, the exclusive-OR gate 19, and the NOT gate 20 output data, respectively, to the data input terminal D of the output latch 21.

The processing circuit further includes a decoder 15 that selects one of the bit transfer buffer 16, the AND gate 17, the OR gate 18, the exclusive-OR gate 19, and the NOT gate 20 based on processing information 8 from the internal bus 2, the processing information 8 being composed of three bits $D_3$, $D_4$, $D_5$ indicating a processing operation to be effected, and turns on a corresponding output buffer gate 41 through 45.

Figure 1:
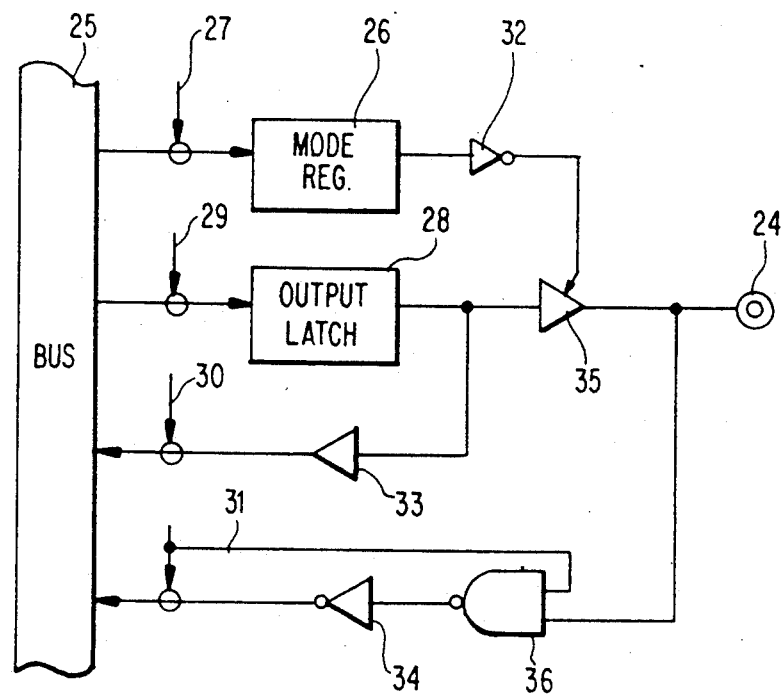
FIG. 1 is a block diagram of one bit of the input/output port of a conventional microprocessor.
Figure 2:
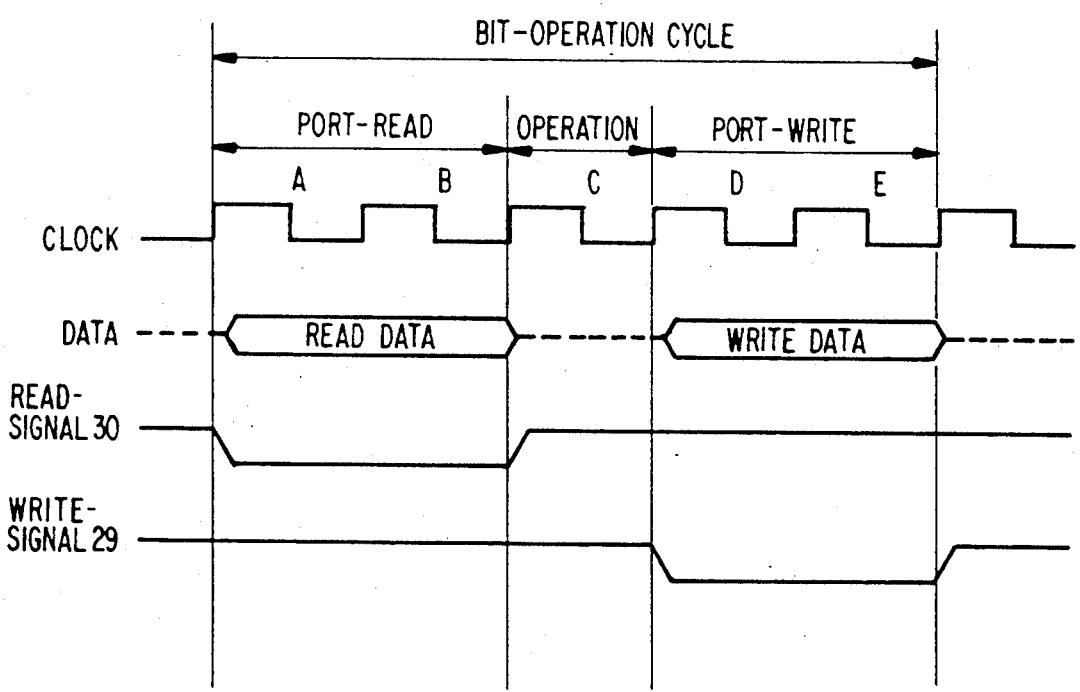
FIG. 2 is a timing chart of the operation in an output mode of the input/output port shown in FIG. 1.

The input/output port includes an input port section which is identical to the conventional input port section shown in FIG. 1. Therefore, the input port section will not be described below.

Operation of the input/output port in an output mode will be described below.

To switch the input/output port into an output mode, data "0" supplied from a CPU (not shown) through the internal bus 2 is written in the mode register 3.

For bit-processing operation, the bit information 5, the processing information 8 (which can indicate up to eight operations with its three bits), and 1-bit data 9 are supplied from the CPU through the internal bus 2 into the input/output port.

Then, an output signal from a particular processing element, i.e., one of the bit transfer buffer 16, the AND gate 17, the OR gate 18, the exclusive-OR gate 19, and the NOT gate 20, is selected by the decoder 15. Since the output latch data 10 is always supplied as an input signal to the gates 17, 18, 19, 20, it is possible to effect an operation which requires the output latch data 10 simply by outputting the information and data 5, 8, 9 from the CPU through the internal bus 2 to the input/output port.

Inasmuch as both the output signal 7 from the decoder 6 and the write signal 14 are inputted to the AND gate 22, it is possible to determine whether the assigned bit is designated by the bit information 5. If the assigned bit is not designated, then the write signal 14 is masked by the AND gate 22.

The output latch 21, which is supplied with output signals from the bit transfer buffer 16, the AND gate 17, the OR gate 18, the exclusive-OR gate 19, and the NOT gate 20 through the data input terminal D, controls data writing operation based on the output signal from the AND gate 22.

With the present invention, as described above, each bit of the input/output port of the microprocessor includes a decoder for indicating whether the assigned bit is designated or not, and a processing circuit which is supplied with an output latch signal. The input/output port of such an arrangement is capable of precluding a cycle for reading output latch data from the port and a cycle for effecting a processing operation. Therefore, a cycle for effecting a bit processing operation is composed of only a cycle for applying the write signal to the port. The microprocessor can therefore process desired data at high speed.

Although a certain preferred embodiment of the present invention has been shown and described in detail, it should be understood that various changes and modifications may be made therein without departing from the scope of the appended claims.

What is claimed is:

1. A microprocessor having as many input/output ports as the number of bits of data to be processed, for processing output latch data of bits in an output mode, characterized in that each of said input/output ports includes:

a decoder for determining whether or not a bit assigned to the input/output port is selected based on bit information which is supplied from a CPU for designating a bit to be processed; and a processing circuit comprising at least one processing element for processing 1-bit data which is supplied from the CPU and/or output latch data which is provided as a feedback to the processing circuit itself, selecting means for transferring processed data from the processing element in accordance with a particular processing operation determined by the CPU, and masking means for allowing the processed data transferred from said selecting means to be outputted only when the bit assigned to the input/output port is selected as determined by said decoder.

2. A microprocessor according to any one of claim 1, wherein said masking means comprises a latch for holding the processed data transferred from said selecting means, and an AND gate for releasing the data from said latch when supplied with both an output signal from the first-mentioned decoder, indicating that the bit assigned to the input/output port is selected, and a write signal from the CPU.

3. A microprocessor according to claim 1, wherein said processing element comprises a bit transfer buffer responsive to the 1-bit data being processed.

4. A microprocessor according to claim 3, wherein said processing circuit further comprises a NOT gate responsive to feedback of the output latch data.

5. A microprocessor according to claim 4, wherein said processing circuit further includes logic circuitry for establishing the presence or absence of one or both the 1-bit data supplied from the CPU and/or the output latch data feedback.

6. A microprocessor according to claim 5, wherein said masking means comprises a latch for holding the processed data transferred from said selecting means, and an AND gate for releasing the data from said latch when supplied with both an output signal from the first-mentioned decoder, indicating that the bit assigned to the input/output port is selected, and a write signal from the CPU.

7. A microprocessor according to claim 5, wherein said logic circuitry consists of an AND gate, an OR gate and an exclusive OR gate, which are individually rendered effective by the selecting means in accordance with the particular processing operation selected by the CPU.

8. A microprocessor according to claim 7, wherein said masking means comprises a latch for holding the processed data transferred from said selecting means, and an AND gate for releasing the data from said latch when supplied with both an output signal from the first-mentioned decoder, indicating that the bit assigned to the input/output port is selected, and a write signal from the CPU.

9. A microprocessor according to claim 8, wherein said selecting means comprises a second decoder for selecting the particular logic processing required in accordance with the processing information furnished by the CPU, and an output buffer gate connected to an output terminal of each logic processing element within the logic circuitry, with each buffer selectively energizable and deenergizable depending on the type of logic processing provided by the second decoder as selected by the CPU.

10. A microprocessor according to claim 9, wherein said masking means comprises a latch for holding the processed data transferred from said selecting means, and an AND gate for releasing the data from said latch when supplied with both an output signal from the first-mentioned decoder, indicating that the bit assigned to the input/output port is selected, and a write signal from the CPU.

* * * * *